April 8, 1958 D. A. JENNY 2,830,239

SEMICONDUCTIVE ALLOYS OF GALLIUM ARSENIDE

Filed April 16, 1956

INVENTOR.
DIETRICH A. JENNY
BY J. C. Whittaker
ATTORNEY

United States Patent Office 2,830,239

Patented Apr. 8, 1958

2,830,239

SEMICONDUCTIVE ALLOYS OF GALLIUM ARSENIDE

Dietrich A. Jenny, Princeton, N. J., assignor to Radio Corporation of America, a corporation of Delaware Application April 16, 1956, Serial No. 578,257

8 Claims. (Cl. 317—237)

This invention relates to improved semiconductor materials and devices, and to methods of making them. More particularly, the invention relates to novel semiconductor alloys of germanium and gallium arsenide.

Semiconductor devices employing semiconductive germanium and silicon are known. The operation of these devices is usually subject to rather severe maximum temperature limitations. The temperature limitation of a typical device is determined primarily by the energy gap between the valence band and the conduction band of the semiconductive material employed. When the temperature of the device reaches a point where the thermal energy is sufficient to raise substantial numbers of electrons across the energy gap, the semiconductive characteristics of the material are adversely affected. For example, the energy gap of germanium is about 0.7 electron volt and many devices using germanium become inoperative above temperatures as low as 80° C. Gallium arsenide has an energy gap of 1.35 electron volts. Hence a device employing semiconductive gallium arsenide can be operated at temperatures estimated to be as high as at least 300° C.

Gallium arsenide as a novel semiconductor material has been disclosed in my co-pending U. S. application, Serial No. 538,040, filed October 3, 1955. It has been discovered that another new and useful semiconductive material comprises an alloy of germanium and gallium arsenide which has a band gap intermediate that of germanium and gallium arsenide, namely 1.25 e. v. This is a tenth of an electron volt lower than the band gap of gallium arsenide and five and a half tenths higher than the band gap of germanium. It might be thought that the higher the band gap the better the semiconductor but this is true only to a limited extent. Referring again to my above-identified U. S. application, it is stated therein that, while the electron mobility of gallium arsenide is about twice the mobility value for germanium and at least four to five times the value for silicon, the whole mobility of gallium arsenide is only one-third the value for germanium. Hence it is intended to improve the whole mobility of gallium arsenide by making alloys thereof with a relatively high mobility material such as germanium. Such alloys also provide semiconductive materials suitable for graded band gap devices such as drift transistors, high efficiency emitters for transistors, and optical devices with very specific band gap requirements. It is also desirable to have semiconductor materials each having a different band gap so that flexibility in choice as to operating temperatures and energy requirements may be had.

It is therefore an object of this invention to provide a novel and useful semiconductive alloy of germanium and gallium arsenide.

Another object of the invention is to provide a novel semiconductive alloy material having a band gap intermediate the band gaps of germanium and gallium arsenide.

A further object of the invention is to provide an improved semiconductor device utilizing a novel semiconductive alloy of germanium and gallium arsenide.

Another object of the invention is to provide an improved junction type semiconductor device having a body of novel alloy of gallium arsenide and germanium.

These and other objects and advantages of the invention are accomplished according to the invention by providing an alloy material comprising germanium and gallium arsenide.

The invention will be described in greater detail with reference to the drawings in which.

Similar reference characters are applied to similar elements throughout the drawing.

*The alloys and method of alloying*

Figure 1:
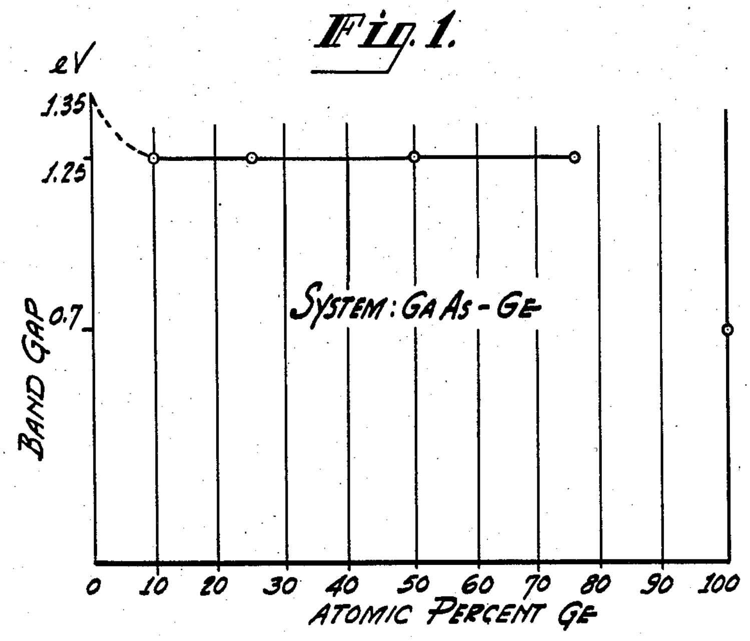
Figure 1 is a graph showing the energy band gap for different alloy compositions of germanium and gallium arsenide.

The alloys of germanium and gallium arsenide are made by melting the materials in an evacuaated and sealed-off quartz ampule. Only the purest materials are employed. The germanium may be purified by a process called "zone levelling" wherein a narrow band of heat is passed along an ingot of germanium so as to successively melt and re-freeze successive portions of the ingots one or more times. Due to the fact that any impurities in the germanium tend to segregate into and remain in the liquid rather than the solid phase of the ingot, they are swept out or toward the terminal end of the ingot. This process is quite well known and is described in greater detail by W. G. Pfann in an article entitled "Principles of Zone-Melting," published in the Journal of Metals, July 1952.

The purest gallium arsenide is obtained by reacting the highest purity gallium and arsenic together in an evacuated and sealed-off quartz ampule. The gallium may be first purified by the zone-levelling process just described. The arsenic is first purified by sublimation in an inert atmosphere such as helium or argon, for example. The materials are heated to a temperature of about 750° C. depending upon particle size and the intimacy of the mixture of gallium and arsenic. The reaction is exothermic and care must be taken to prevent excessive heating. On the other hand, too low a temperature results in too slow a reaction. After the reaction is completed, the gallium arsenide is heated to about 1250° C. (the melting point of gallium arsenide) and then solidified under a temperature gradient so as to result in progressive crystallization of the molten mass. This process of crystallization is well known and is termed "gradient freezing." Part of the advantage derived by freezing the gallium arsenide in this manner lies in further purification of the material due to the segregation phenomenon of impurities in the melt. A more comprehensive description of the preparation of gallium arsenide is found in my co-pending application, Serial No. 538,040, filed October 3, 1955, and assigned to the instant assignee.

The gallium arsenide and germanium thus obtained are heated to the melting point of gallium arsenide (about 1250° C.). The germanium (melting at about 950° C.) of course is molten at this temperature and a complete mixing of the molten materials is obtained. Thereafter the molten mass is slowly cooled under a temperature gradient of about 50° to 100° C. per inch along the length of the melt. The gradient may be easily established by moving the quartz ampule to an asymmetrical position with respect to the heating elements in the furnace. By gradually reducing the furnace temperature at a rate of about 100° C. per hour or less the melt is frozen in a progressive manner proceeding from the "cold" end thereof to the "hot" end.

An alloy of 25% Ge-75% GaAs is made by melting together 2 grams of germanium and 6 grams of gallium arsenide. (The gram equivalent weights of Ge and GaAs are very nearly identical, being 72.315 for GaAs and 72.6 for Ge). An alloy of 10% Ge-90% GaAs is prepared by melting together 0.8 gram of germanium and 7.2 grams of GaAs.

It has been discovered according to the invention that in alloys of gallium arsenide and germanium, as the percentage of germanium is increased from 10% to 25%, a proportion is reached at which the alloy becomes two phased—crystalline gallium arsenide and crystalline germanium. The precise percentages of germanium in gallium arsenide at which the system becomes two-phases is not known. It is known that 10% Ge in GaAs provides a single phase alloy and that 25% Ge in GaAs provides a two phase alloy.

Referring to Figure 1, it will be seen that the band gap of a 10% Ge–90% GaAs alloy is 1.25 e. v. as compared with a band gap of 1.35 e. v. for 100% GaAs. Furthermore Figure 1 shows that the band gap as measured for different Ge-GaAs alloys remains at 1.25 e. v. throughout the range of 10 to 75% germanium. Hence though the alloy contains two phases for percentages of germanium in excess of 10%, the band gap remains unchanged and as far as band gap considerations alone are concerned there is no particular merit in an alloy containing more than 10% germanium. Because of the inability to precisely define the percentage of Ge in GaAs at which the system becomes two phased, and because of the fact that a two-phase alloy may be of utility despite its two phases, the alloy, Ge–GaAs, is a new and useful material without regard to the percentage of its constituents or the phase characteristics of alloys containing more than 10% germanium.

The conductivity type of the alloys formed according to the invention are "n-type" which indicates the presence of impurities which have an excess number of electrons in their valence shell. The germanium of course as used in the alloys of the invention is undoped. It is believed therefore that the conductivity type of the alloys formed with Ge and GaAs is due to the gallium arsenide. Referring to my aforementioned co-pending application, it is not known whether the conductivity type of the gallium arsenide as produced is due to foreign impurities or whether it is inherent in the method or the materials (elemental gallium and arsenic or the compound itself).

Figure 2:
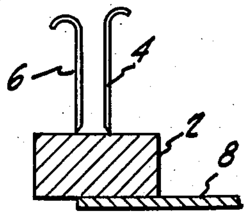
Figure 2 is a cross-sectional, elevational view of a point contact semiconductor device utilizing materials prepared according to the invention.

A typical semiconductive transistor device comprising a semiconducting body of an alloy of germanium and gallium arsenide is shown in Figure 2. To one surface of a wafer 2 of alloyed germanium and gallium arsenide an electrical lead 8 is bonded by means of a non-rectifying solder connection. Upon the opposite surface of the wafer two closely spaced relatively hard, pointed metallic wires 4 and 6 are pressed. The ends of the wires are sharpened to chisel points so that the areas of contact between the wafer and the wires are minimized. The ends of the wires contact the wafer at two points about .0005" apart. One of the wires may be employed in a circuit as an emitter electrode, the other wire as a collector electrode, and the lead 8 may conveniently serve as a base connection. Alternatively, one of the electrodes 4 and 6 may be omitted to make rectifier devices.

Figure 3:
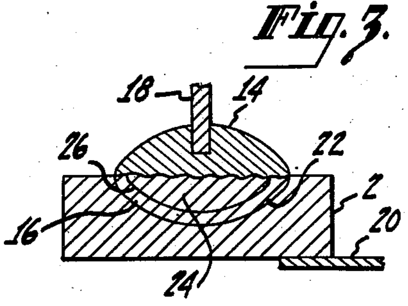
Figure 3 is a cross-sectional, elevational view of an alloyed junction type semiconductor device utilizing materials according to the invention.

Referring to Figure 3, an alloy junction type device is shown comprising a base wafer 2 of an alloy of germanium and gallium arsenide doped with selenium, for example, so as to be of n-type conductivity. The wafer may conveniently be about 0.25" square x .006" thick. An electrode 14 which may be cadmium is fused to the surface of the wafer 2 to form within the wafer a p-n rectifying junction 26. The two electrical leads 18 and 20 make contact with the cadmium electrode 14 and the wafer 2, respectively.

In order to form the alloy junction of Figure 3 the wafer 2 and the cadmium electrode pellet 14 are heated together in a non-oxidizing atmosphere at about 400° to 700° C. for about fifteen minutes. The pellet is thus alloyed into the wafer to form the device shown in Figure 3. The device is generally similar in structural details to corresponding alloy type devices made of other semiconductive materials. The furthest point of penetration of the cadmium pellet into the wafer is called the alloy front and is shown by the line 22. During the alloy process a portion of the wafer is dissolved into the molten pellet and during cooling a recrystallized region 24 rich in cadmium and an integral part of the wafer is formed adjacent the alloy front. This region has p-type conductivity. A p-n rectifying junction 16 is formed adjacent the alloy front. The electrical leads 18 and 20 may be attached by non-rectifying solder connections. Thereafter the device may be etched, mounted, and potted according to conventional techniques utilized in conjunction with germanium semiconductor devices.

Figure 4:
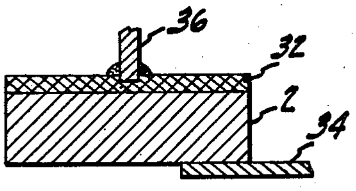
Figure 4 is a cross-sectional, elevational view of a diffused junction-type semiconductor device utlizing materials and made by methods according to the invention.

Referring to Figure 4, a diffusion junction device is illustrated. This junction type is made by diffusing a p-type impurity into the n-type germanium-gallium arsenide alloy. The impurity can be zinc, cadmium, or mercury, The n-type germanium-gallium arsenide body is placed in a quartz ampule and contained within the ampule in a saturated cadmium atmosphere at about 800° C. for about three hours. It should be noted that the diffusion temperature is well below the melting point of germanium and gallium arsenide. The depth of penetration is estimated to be a few microns. A device employing a junction made according to this method comprises a wafer 2 of n-type germanium-gallium arsenide alloy having a diffused surface region 32 consisting essentially of a transition from pure cadmium to pure germanium-gallium arsenide. Terminals 34 and 36 are connected to the wafer 2 and to the diffused junction region 32, respectively, by soldering, for example.

Although only devices employing n-type germanium-gallium arsenide have been described, it should be understood that gallium arsenide of p-type conductivity can also be employed. In the alloy junction device shown in Figure 3 the wafer 2 could be p-type germanium-gallium arsenide, that is, doped with cadmium. The junction electrode 14 could be a "donor" such as selenium or tellurium. The diffused junction device shown in Figure 4 could comprise cadmium-doped germanium-gallium arsenide to give a p-type wafer into which is diffused an n-type impurity such as sulfur or selenium.

There thus has been described new and useful semiconductor materials as well as methods for making such materials. In addition, several useful and distinctly different devices using such semiconductor materials have been described as well as methods for making these devices.

What is claimed is:

1. A semiconductor device comprising a body of an alloy of gallium arsenide and germanium, and at least one rectifying electrode in contact therewith.

2. A semiconductor device comprising a body of an alloy of gallium arsenide and less than 25% germanium, and at least one rectifying electrode in contact therewith.

3. A semiconductor device comprising a body of an alloy of gallium arsenide and germanium, said body having a particular type of conductivity, and an electrode of opposite conductivity type in intimate contact with at least one surface of said body.

4. A p-n rectifying junction type semiconductor device comprising a body of an alloy of gallium arsenide and germanium, said body having a particular type of conductivity, and at least one electrode of opposite conductivity type fused to said body whereby a p-n rectifying junction is formed between said body and said electrode.

5. A diffustion junction type semiconductor device comprising a body of an alloy of gallium arsenide and germanium, said body having a particular type of conductivity, a diffusion region near the surface of said body, and a p-n rectifying junction disposed within said body adjacent said region, said region comprising an element which imparts opposite conductivity to said body when diffused therein.

6. A semiconductor device comprising a body of a single phase alloy of germanium and gallium arsenide, and at least one rectifying electrode in contact therewith.

7. A semiconductive device comprising a body of a single phase alloy of gallium arsenide and less than 25% germanium, and at least one rectifying electrode in contact therewith.

8. A semiconductor device comprising a body of an alloy of gallium arsenide and germanium, and at least one electrode connected thereto.

References Cited in the file of this patent

Electronics, March 1954, pages 238, 240, 242.

Welker: Zeit fur Naturforschung, vol. 7a, pages 744–749, November 1952.